(12) United States Patent
Kasai et al.

(10) Patent No.: US 6,476,361 B2
(45) Date of Patent: Nov. 5, 2002

(54) HEATER UNIT FOR TRAY

(75) Inventors: Toru Kasai, Tokyo (JP); Shuntaro Kuriyama, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 09/996,760

(22) Filed: Nov. 30, 2001

(65) Prior Publication Data

US 2002/0066723 A1 Jun. 6, 2002

(30) Foreign Application Priority Data

Dec. 5, 2000 (JP) .................... 2000-369757

(51) Int. Cl.$^7$ ............. H05B 3/28; H05B 3/32; A47J 36/24
(52) U.S. Cl. ............. 219/386; 219/521; 219/537; 219/539; 219/544
(58) Field of Search ............. 219/385, 386, 219/403, 521, 537, 539, 544

(56) References Cited

U.S. PATENT DOCUMENTS

| | | | | |
|---|---|---|---|---|
| 4,068,115 A | * | 1/1978 | Mack et al. | 219/386 |
| 5,403,997 A | * | 4/1995 | Wimpee et al. | 219/386 |
| 6,373,028 B2 | * | 4/2002 | Williamson et al. | 219/548 |

* cited by examiner

Primary Examiner—Joseph Pelham
(74) Attorney, Agent, or Firm—Armstrong, Westerman & Hattori, LLP

(57) ABSTRACT

A heater unit mounted on a tray utilizes a PTC heater 100 having a positive temperature coefficient (PTC), and a sheet heater 200 superposed thereto. The PTC heater 100 includes PTC members 150 buried within an insulating substrate 130, and on both sides of the PTC members are placed copper foils 120, 122 functioning as electrodes. When the PTC heater 100 is heated up to a preset temperature, the electric resistance of the heater is increased greatly, and the heating is stopped, maintaining the preset temperature. The sheet heater 200 contributes to reduce the time the heater needs to rise to the preset temperature during initial startup.

3 Claims, 4 Drawing Sheets

HEATER UNIT FOR TRAY

FIELD OF THE INVENTION

The present invention relates to a heater unit equipped to a tray stored in a food cart used on board an aircraft.

Heretofore, the food cart used on board an aircraft is cooled as a whole by a chiller and the like, and then a dish on the tray mounting meat, fish and the like that needs to be served warm is heated partially.

There are two types of heater units for heating the dishes. One type mounts individual thermostats, and thereby controls the temperature, and the other type controls the current or voltage supplied thereto using a control box.

On the other hand, the requirements related to the electromagnetic interference caused by the electronic devices on board the aircraft are becoming more serious. If the heater unit utilizes a thermostat for heat control, the unit is required to include a circuit capable of absorbing the electromagnetic wave generated when the device is turned on and off by a ferrite core and the like, and the structure of the heater unit becomes complex.

Further, since the thermostat is relatively large, the thickness of the heater unit is increased and the height of the portion of the tray where the heater unit is positioned becomes too high.

However, the unit utilizing current or voltage control requires a complex control circuit leading to increase of the manufacturing cost.

In order to solve the above-mentioned problems, a heater having a PTC function is proposed, thereby enabling to cut out the thermostat and the like from the heater. However, according to the proposed heater, a considerably long time is required for the heater to rise up to a certain temperature.

SUMMARY OF THE INVENTION

The present invention aims at providing a thin-type heater unit having advantageous heat responsibility, that does not require a costly control system and does not generate electromagnetic waves caused by the power being turned on and off.

The present invention utilizes a ceramic heater (hereinafter called a PTC heater) having positive temperature coefficient, characterized in that when if the heater reaches a certain temperature, the electrical resistance increases rapidly and the temperature is maintained at a set value (positive temperature coefficient: PTC). The ceramic heater (PTC heater) is connected in series with a sheet heater, and the heaters are bonded so that heat interference is caused between the ceramic heater and the sheet heater.

According to the present invention, the tray for a service cart used on board an aircraft comprises as means for heating food a plural number of ceramic heaters having a positive temperature coefficient that are connected in parallel within an insulated substrate having advantageous heat resistance, and a sheet heater, wherein the ceramic heaters and the sheet heater are connected in series.

The ceramic heaters and the sheet heater are bonded integrally via an insulating layer, and the surface layer is also covered with a similar insulating layer.

Moreover, the heater unit is adhered integrally on one side thereof with a metal having high thermal conductivity.

DETAILED DESCRIPTION OF PREFERRED EMBODIMENTS

Figure 1:
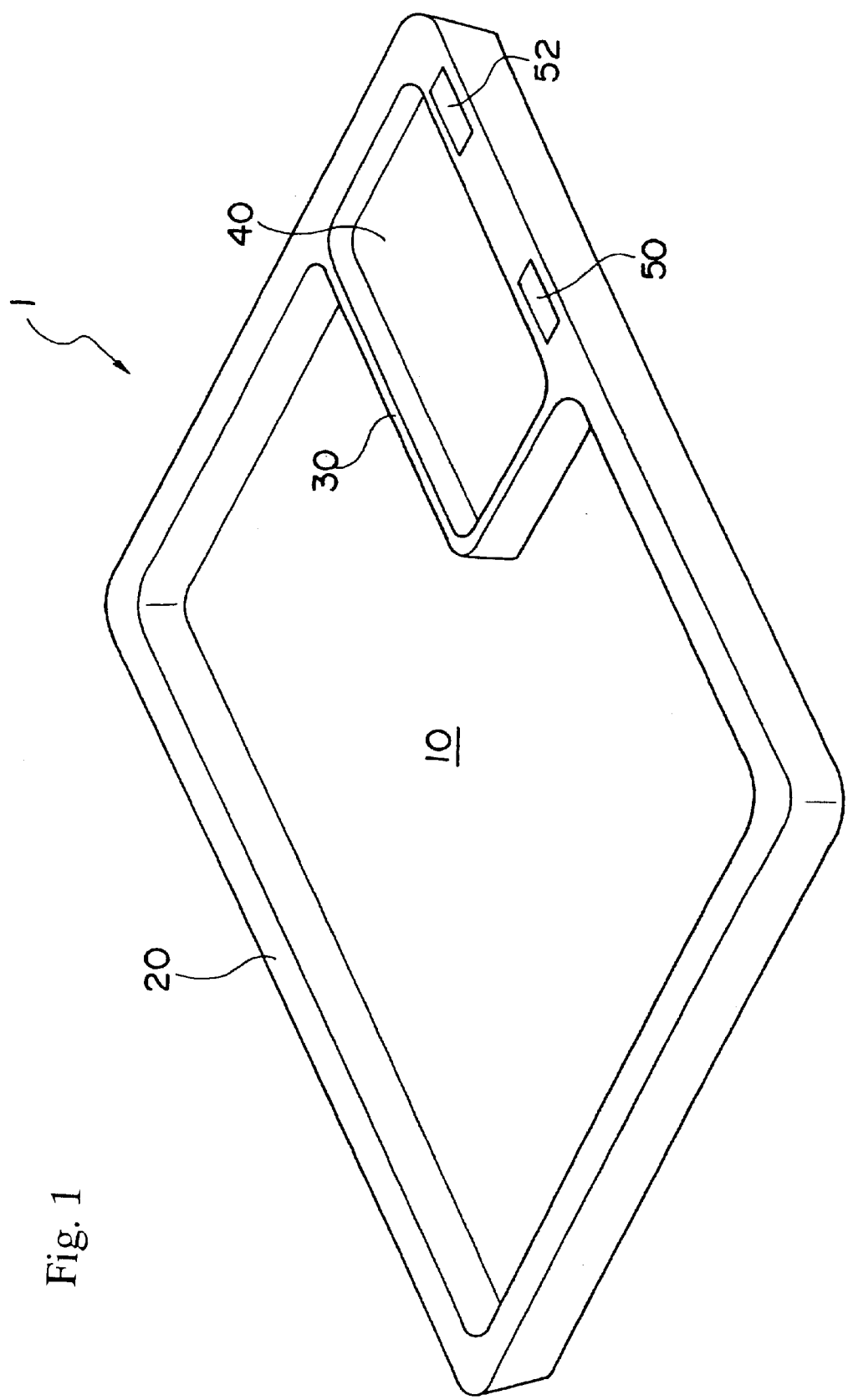
FIG. 1 is a perspective view of the tray applying the present invention.

FIG. 1 is a perspective view of a tray equipped with the heater unit according to the present invention.

The tray for serving in-flight meal shown as a whole by reference number 1 comprises a tray-shaped body 10, and various dishes and plates can be mounted on the body 10. The periphery of body 10 is surrounded by a protrusion 20, enabling the dishes etc. to be placed safely on the tray.

A protrusion 30 defines a heater portion 40 on one area of the body 10, and the heater unit according to the present invention is equipped within the heater portion 40. A pair of electrodes 50, 52 is mounted near the heater portion 40.

When the tray 1 is placed inside the service cart, the electrodes equipped to the service cart for supplying power contact the pair of electrodes 50 and 52 onof the tray. When the service cart is stowed to the predetermined position within the galley of the aircraft, a connector on the service cart is electrically connected with the power supplying connector within the galley, and power is supplied to the heater portion of each tray.

A casserole for warm food is placed on the heater portion 40, and the food placed on the casserole is heated to an appropriate temperature.

Figure 2:
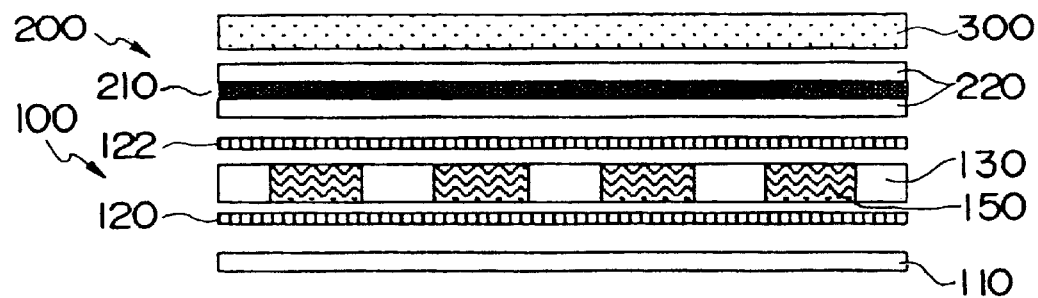
FIG. 2 is a cross-sectional view showing the structure of the heater unit according to the present invention.
Figure 3:
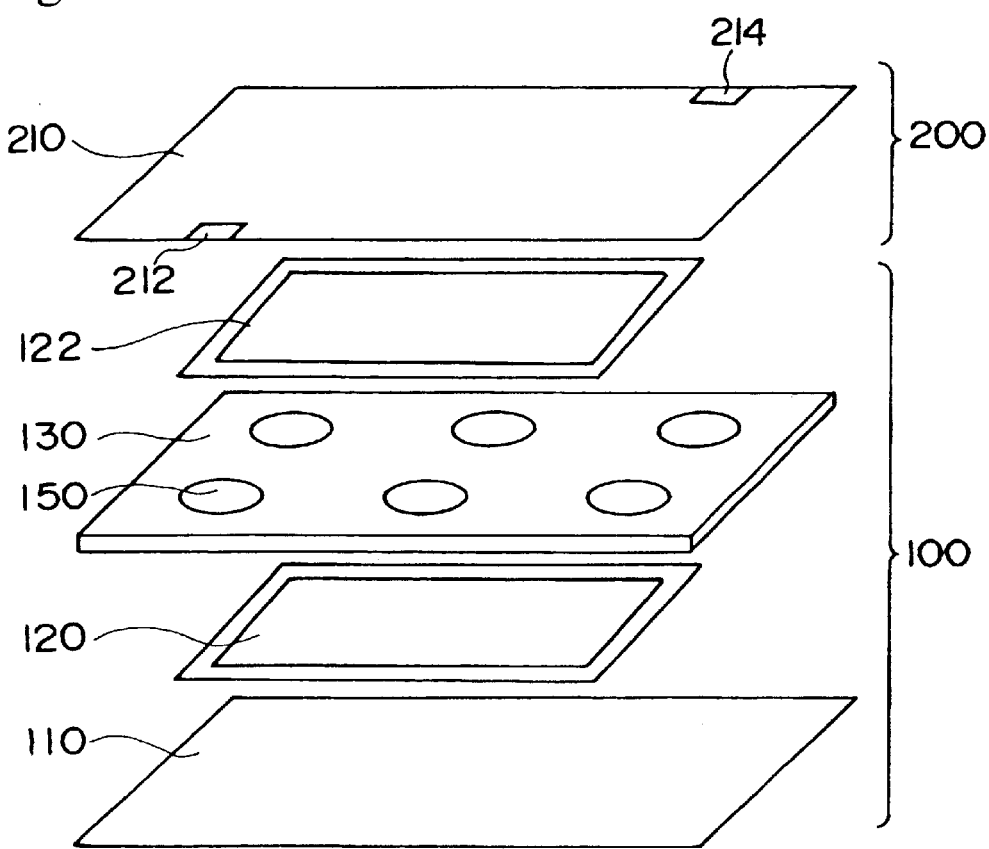
FIG. 3 is a perspective view showing the heater unit according to the present invention.

FIG. 2 is an explanatory view showing the cross-sectional structure of the heater unit according to the present invention, and FIG. 3 is a perspective view showing the main portion of the heater unit.

The heater unit according to the present invention comprises a ceramic heater (hereinafter called a PTC heater) 100 having a positive temperature coefficient (PTC), and a conventional sheet heater 200 superposed on the PTC heater 100 and connected thereto in series.

The PTC heater 100 comprises on an insulating material 110 PTC members 150 sandwiched by two copper foils 120 and 122 serving as conductive material. Each PTC member is a disk-shaped member for example, and supported within a substrate 130 made of insulating material. When electricity is conducted to the two copper foils 120 and 122, current flows through the PTC members 150. The PTC members generate heat according to their own resistance, thereby functioning as heater.

Since the resistance of each PTC member increases rapidly after reaching a predetermined temperature, the electricity being conducted is reduced once the heater reaches a certain temperature, and a fixed temperature is thereby maintained.

The sheet heater 200 superposed on the PTC heater 100 comprises a heater member 210 covered by a heat resistive insulating film 220. The heater member 210 is an ordinary sheet heater that generates heat when electricity is conducted between the electrodes 212 and 214. By superposing the sheet heater on the PTC heater 100, the rising characteristic of temperature during the initial heating of the whole heater unit is improved, and therefore the usefulness of the heater unit is also improved.

On the upper surface of the sheet heater 200 is fixed an aluminum plate 300 serving as the heat slinger.

Figure 4:
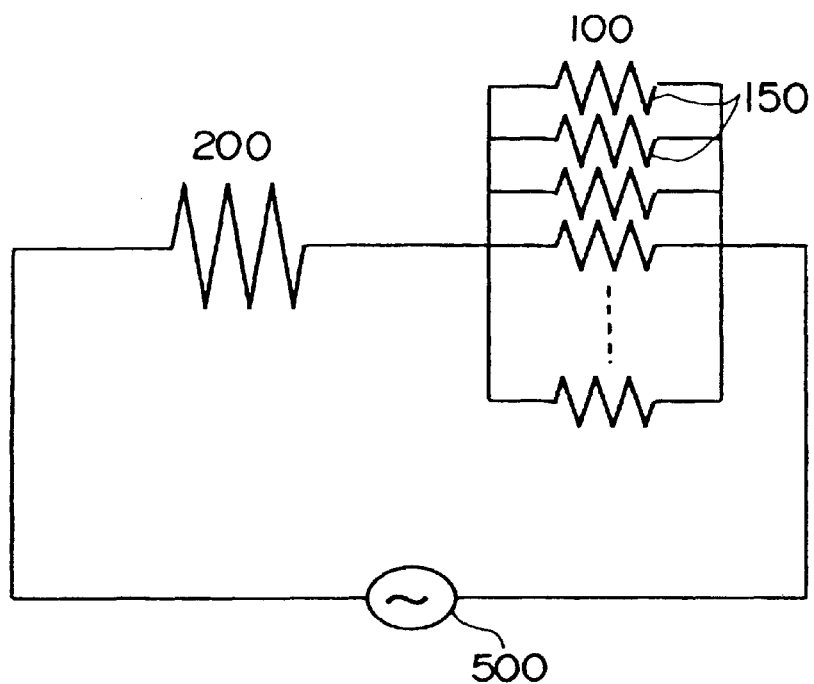
FIG. 4 is a circuit chart showing the heater unit according to the present invention.

FIG. 4 is a circuit diagram of the heater unit according to the present invention, wherein the sheet heater 200 and the PCT heater 100 are connected in series to the power source 500.

Figure 5:
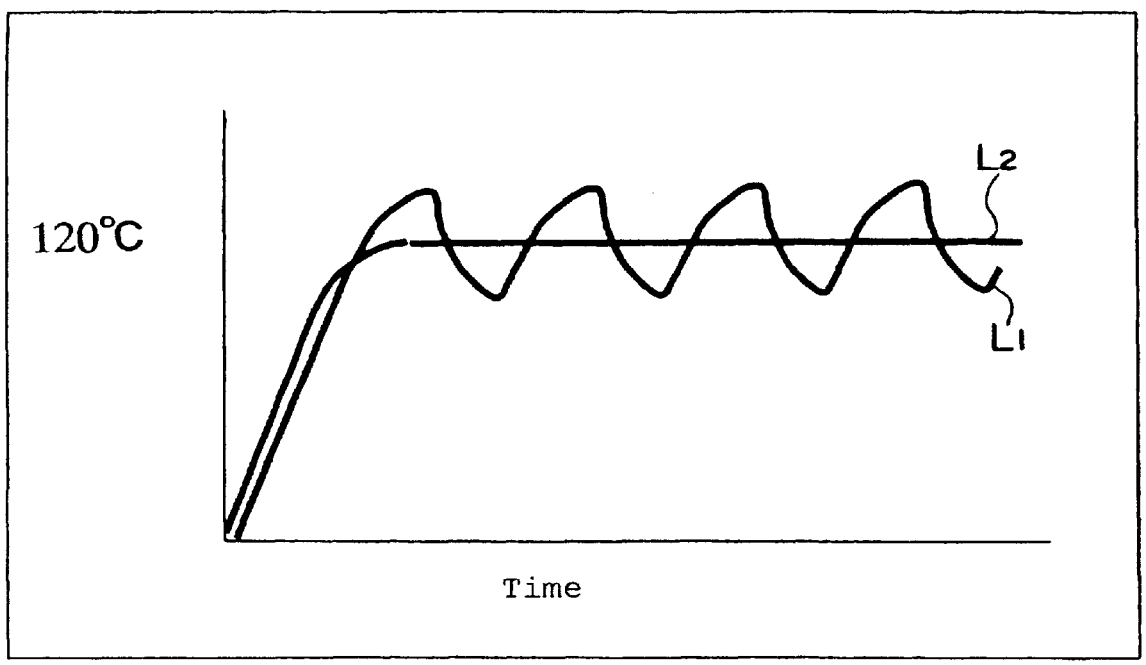
FIG. 5 is a chart showing the characteristics of the heater unit according to the present invention and a heater controlled by a thermostat.

FIG. 5 is a chart showing the performance characteristics of the heater controlled by a conventional thermostat and the heater unit according to the present invention, wherein the horizontal axis represents the time and the vertical axis represents the surface temperature of the heater. Curve $L_1$ shows the performance of a conventional heater controlled by a thermostat in which power is turned on and off in order to control the temperature, and the curve $L_1$ showing the prior art heater performance indicates that the power of the heater is turned on and off repeatedly within a 10° C. range above and below the preset temperature of 120° C.

On the other hand, the curve $L_2$ showing the performance of the heater unit according to the present invention indicates that the present heater is controlled stably at the preset temperature.

Moreover, the sheet heater being superposed on the PTC heater contributes to raise the temperature rapidly even just after the heating is started.

Figure 6:
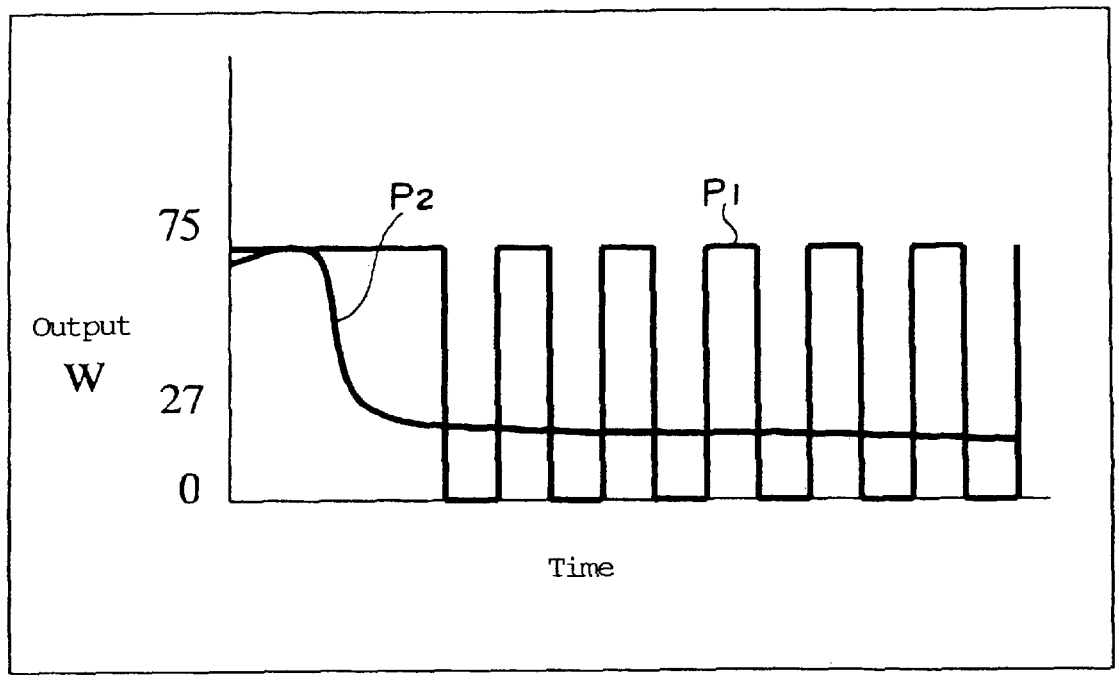
FIG. 6 is a chart showing the characteristics of the heater unit according to the present invention and a heater controlled by a thermostat.

FIG. 6 shows the variation of effective power, wherein according to a prior art thermostat controlled heater the power is repeatedly turned on and off at 75 W as shown in $P_1$, whereas according to the present heater unit the effective power is stabilized at around 27 W as shown in $P_2$. Moreover, the present heater unit is advantageous in that it does not generate electromagnetic waves caused by the power being turned on and off.

Figure 7:
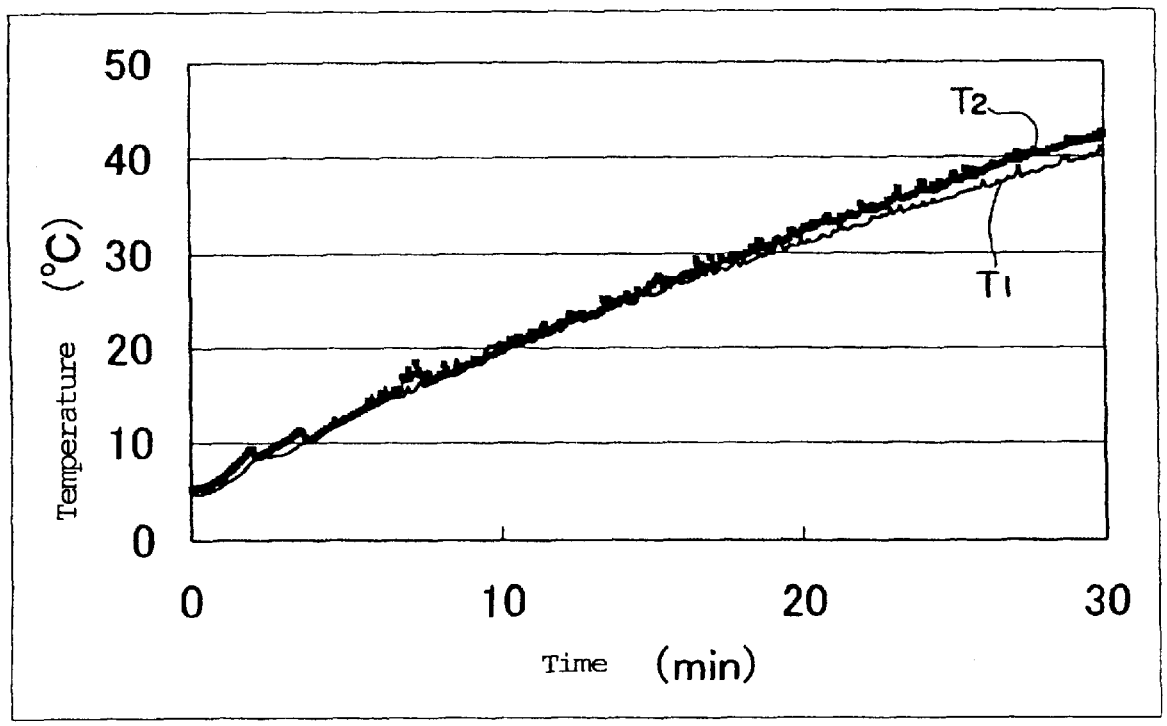
FIG. 7 is a chart showing the characteristics of the heater unit according to the present invention and a heater controlled by a thermostat.

FIG. 7 shows the variation of temperature when a load of 250 g of water is placed on the heater. The heater $T_1$ controlled by a thermostat and the heater unit $T_2$ according to the present invention show substantially equal characteristics, by which the usefulness of the heater unit according to the present invention is confirmed.

As explained, since the heater unit according to the present invention does not require a thermostat for controlling the temperature thereof, the unit does not generate harmful electromagnetic waves. Therefore, the present heater unit is most suitably utilized on board an aircraft when serving in-flight meal. Further, the reliability of the heater unit is improved since it uses no traveling contact such as bimetal.

Moreover, since the present heater unit is formed by superposing a sheet heater on a heater using PTC members, the time needed for the temperature to rise to a predetermined temperature after startup is effectively reduced, and the temperature control of the tray is achieved securely.

We claim:

1. A heater unit for a tray of a service cart used on board an aircraft, said heater unit comprising as means for heating food a plurality of ceramic heaters having positive temperature coefficient that are connected in parallel within an insulating substrate having advantageous heat resistance, and a sheet heater;

wherein said ceramic heater and said sheet heater are connected in series.

2. A heater unit for a tray according to claim 1, wherein said ceramic heaters and said sheet heater are adhered integrally via an insulating layer, and the surface layer thereof is also covered with an insulating layer.

3. A heater unit for a tray according to claim 2, wherein said heater unit is adhered integrally on one side thereof with a metal having high thermal conductivity.

* * * * *